(12) United States Patent
Orito (10) Patent No.: US 6,392,709 B1
(45) Date of Patent: May 21, 2002

(54) PROGRAM TABLE DISPLAY DEVICE AND METHOD

(75) Inventor: Takaki Orito, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/195,560

(22) Filed: Nov. 19, 1998

(30) Foreign Application Priority Data

Nov. 21, 1997 (JP) .............................................. 9-321644

(51) Int. Cl.[7] .............................................. H04N 5/445
(52) U.S. Cl. ........................ 348/569; 348/563; 725/40
(58) Field of Search ................................ 348/569, 564, 348/561, 906; 725/37, 39, 40, 61, 135, 140, 142, 145, 146, 151; H04N 5/445

(56) References Cited

U.S. PATENT DOCUMENTS 510,980 A * 4/1996 Peters ........................ 707/503
5,793,438 A * 8/1998 Bedard ........................ 348/569
5,940,073 A * 8/1999 Klosterman et al. ........ 348/906

FOREIGN PATENT DOCUMENTS

JP 9-149326 6/1997 .......... H04N/5/445
JP 9-200706 7/1997 ............ G09G/5/00

* cited by examiner

*Primary Examiner*—Michael H. Lee
(74) *Attorney, Agent, or Firm*—Whitham, Curtis & Christofferson P.C.

(57) ABSTRACT

A mouse cursor is fitted to a program name whose detailed data is wanted to be displayed, among the program names included in the program table displayed on the display, and a mouse button is clicked. The program table is expanded in the channel axis direction and the time axis direction, corresponding to the display column of that program name, and is displayed. Consequently, the space of the display column of that program is enlarged, and in the enlarged display column, the detailed data relating to the program is displayed together with the program name. Thus, the total program table can be displayed in the listing form, and further, the detailed data relating to the desired program can be displayed in the understandable way.

16 Claims, 8 Drawing Sheets

| CHANNEL | TIME 12:00 | 13:00 | 14:00 |
|---|---|---|---|
| ○○○ | | ○○○○··· | |
| △△△ | ··· | ×××× ··· | |
| □□□ | | ◇◇◇··· | |
| ××× | | △△△△··· | |

| ITEM NUMBER | DB ITEM | REGISTERED RECORD | | | |
|---|---|---|---|---|---|
| | | 001 | 002 | 003 | ... |
| 1 | RECORD KEY | | | | |
| 2 | CHANNEL NUMBER | | | | |
| 3 | CHANNEL TITLE | | | | |
| 4 | BROADCASTING START TIME | | | | |
| 5 | BROADCASTING HOUR | | | | |
| 6 | PROGRAM TITLE | | | | |
| 7 | DETAILED CONTENTS OF PROGRAM | | | | |
| 8 | CATEGORY OF PROGRAM | | | | |
| 9 | OTHERS | | | | |
| 10 | | | | | |
| 11 | | | | | |

| CHANNEL | TIME | | |
|---|---|---|---|
| | 12:00 | 13:00 | 14:00 |
| ○○○ | | ○○○○··· | ▽▽▽··· |
| △△△ | ··· | ××××··· | |
| □□□ | | ◇◇··· | □□□□··· |
| ××× | | △△△△··· | ··· |

FIG. 9

| CHANNEL | TIME | | |
|---|---|---|---|
| | 12:00 | 13:00 | 14:00 |
| ○○○ | | ○○○○··· | ▽▽▽··· |
| △△△ | ··· | ××××··· | |
| □□□ | | ◇◇··· | □□□□··· |
| ××× | | △△△△··· | ··· |

PROGRAM TABLE DISPLAY DEVICE AND METHOD

BACKGROUND OF THE INVENTION

1. Field of the Invention

The present invention relates to a program table display device and a method for displaying the data relating to a desired program in the program table in detail.

2. Description of the Related Art

Character multiplex broadcasting has been put to practical use, in which the digital data indicating the character data or the like is superimposed on the picture-voice signal of a television broadcast. There is a program table showing the program name, the broadcasting hour, or the like of the broadcast program of the television broadcast, as one of the data provided by the character multiplex broadcasting system hereinafter, referred to as the character multiplex data).

Figure 1A:
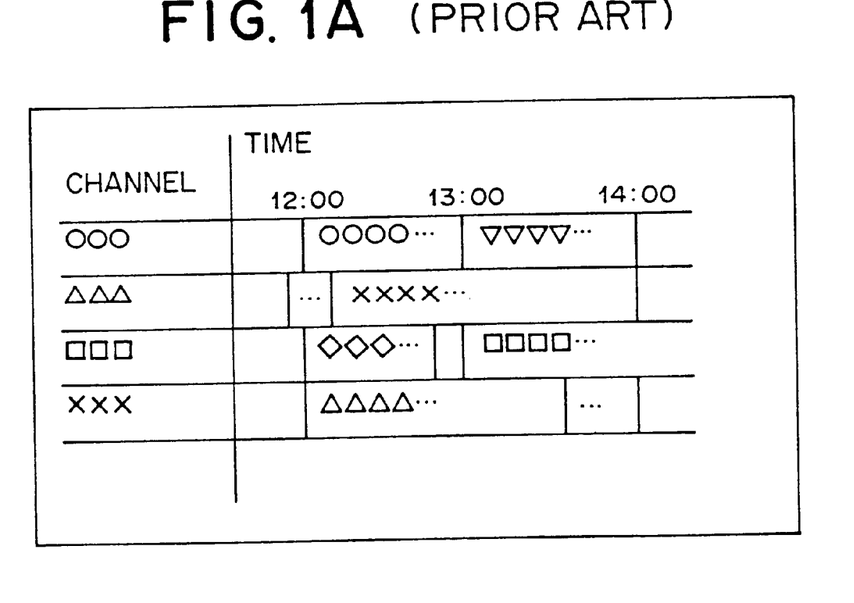
FIGS. 1A and 1B are figures showing an example of a program table shown in the display in a conventional example.
Figure 1B:
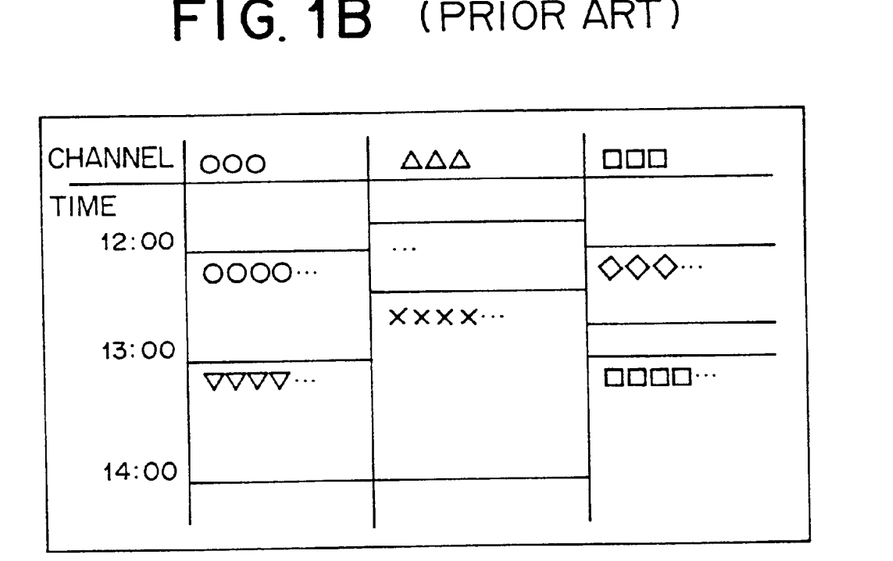

The display examples onto the display of a television receiver are shown in FIGS. 1A, 1B, which have previously been provided as program tables to be provided by such character multiplex data. In these program tables, a display frame corresponding to each of the programs is provided according to the channel and the broadcasting hour, and what program is broadcast, on which channel it is broadcast, and when it is broadcast are shown in a listing form. However, it is impossible to show the detailed data relating to the program indicated in each display frame, only by such a display in the listing form. Therefore, in order to make it possible to show the detailed data, previously the following method has been used.

Figure 2:
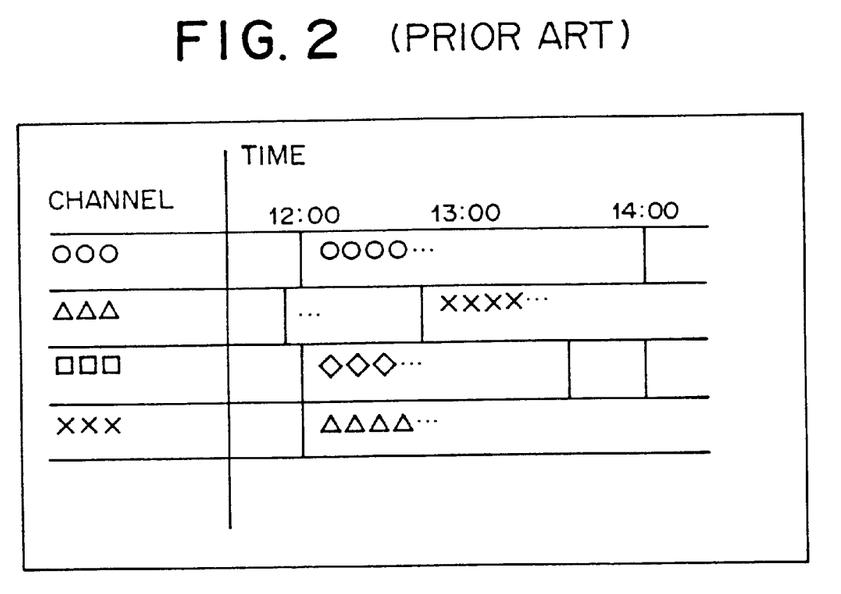
FIG. 2 is a figure showing an example in which the column relating to the specified program in the program table displayed in the display in a conventional example, is expanded in the time axis direction.
Figure 3:
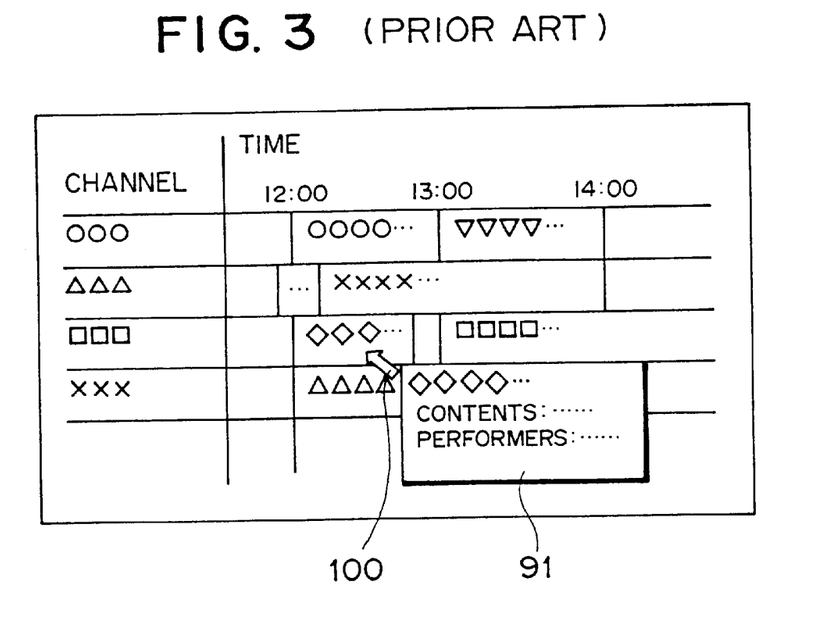
FIG. 3 is a figure showing an example in which the data relating to the specified program in the program table displayed in the display in a conventional example, is shown in a pop up window.
Figure 4:
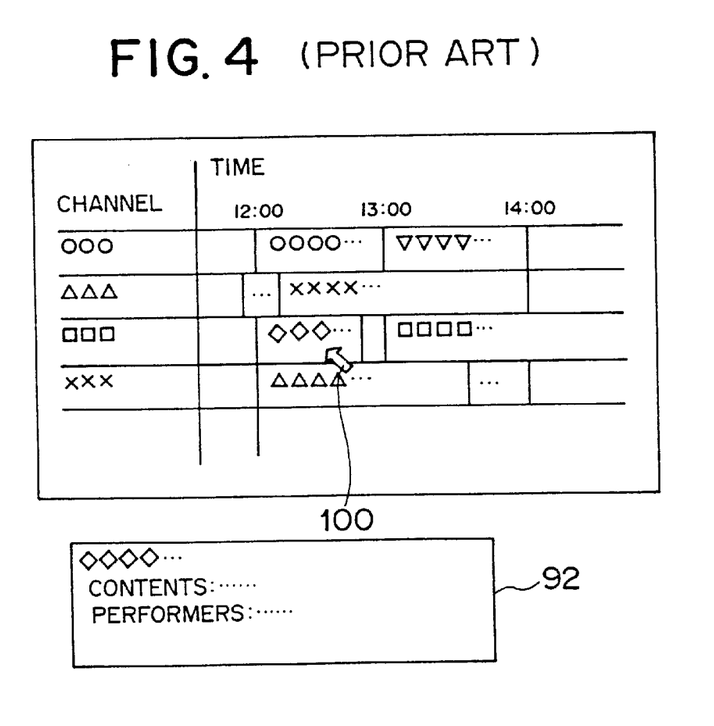
FIG. 4 is a figure showing an example in which the data relating to the specified program in the program table displayed in the display in a conventional example, is shown in another window.

First, as shown in FIG. 2, there is such a method that the size in the time axis direction of the program table (in this example, the horizontal axis direction) is widened corresponding to the program name whose detailed display is required, so that the detailed data may be shown in the enlarged display frame. Secondly, as shown in FIG. 3, there is such a method that a pop up window 91 is opened corresponding to a mouse cursor 100, so that the detailed data may be shown in this pop up window 91. Thirdly, as shown in FIG. 4, there is such a method that another window 92 separated from the program table is opened, so that the detailed data corresponding to the program name indicated by the mouse cursor 100 may be shown in the window 92.

However, in the above mentioned first method, there has been such a problem that the program table is widened only in the time axis direction, and therefore, it becomes difficult to grasp the total image of the program table. Furthermore, in the above mentioned first method, there has been such a problem that it is necessary to perform the widening of the program table in the time axis direction by the operation with the operational key, the indication with the icon provided outside the program table, or the like, and therefore, the operation is troublesome.

In the above mentioned second method, there has been such a problem that a part of the program table is hidden under the pop up window 91 and becomes invisible by opening the pop up window 91. Furthermore, in the above mentioned third method, there has been such a problem that the detailed data shown in the window 92 is displayed in an area separated from the corresponding program name, and therefore, it is difficult to know the corresponding relation between the detailed data and the program name.

SUMMARY OF THE INVENTION

An object of the present invention is to provide a program table display device and a method by which the total program table can be shown in the listing form, and the detailed data relating to the desired program can be shown in the understandable way.

A program table display device according to a first view point of the present invention, comprises:

a memory section in which a plurality of first data respectively relating to different programs, and a plurality of second data respectively corresponding to the first data and including the data more particular than the corresponding first data are stored;

a display section in which a plurality of display frames corresponding to the plurality of first data stored in the memory section are provided and which displays a program table having the plurality of corresponding first data put in each display frame;

an indicating section which indicates the desired first data among the plurality of first data in the program table shown in the display section;

a data obtaining section which obtains the plurality of second data corresponding to the first data indicated by the indicating section, from the memory section; and a display control section which expands the corresponding display frame among the plurality of display frames displayed in the display section, according to the second data obtained by the data obtaining section, and which puts the second data obtained by the data obtaining section together with the first data into the expanded display frame and displays the data in the display section.

In the program table display section, the first desired data in the program table displayed in the display section is indicated by the indicating section, and consequently, the display frame corresponding to the indicated first data is expanded and displayed, and in this expanded display frame, the second data is displayed together with the first data. Therefore, in the case where the program table is displayed in the display section so that the total image may be grasped, the program table showing the second data can be displayed in the display section without damaging the display form. Furthermore, since the second data is displayed together with the first data in the expanded display frame, the second data can easily be confirmed. Moreover, since it is sufficient to perform only the indication by the indicating section, the operation is also easy.

In the above mentioned program table display device, each display frame in the program table may be, for example, frame which is displayed in the display section in parallel for every broadcasting channel of the program corresponding to the first data put in each display frame.

In this case, the display control section can be a section which expands all display frames corresponding to the broadcasting channel of the program according to the first data indicated by the indicating section and displays them in the display section.

In the above mentioned program table display device, each display frame in the program table may be, furthermore, a frame whose position is put in order for every broadcasting time zone of the program corresponding to the first data put in each display frame, and which is displayed in the display section.

In this case, the display control section can be section which expands all display frames corresponding to the broadcasting time zone of the program according to the first data indicated by the indicating section, and which displays them in the display section.

A program table display device according to a second view point of the present invention, comprises:

a memory device in which a plurality of first data respectively relating to different programs, and a plurality of second data respectively corresponding to the first data and including the data more particular than the corresponding first data are stored;

a display device in which a plurality of display frames corresponding to the plurality of first data stored in the memory section are provided, and which displays a program table having the plurality of corresponding first data put in each display frame;

an indicating device which indicates the desired first data among the plurality of first data in the program table shown in the display section; and a control device which is connected to the memory device, the display device, and the indicating device, and which controls the memory device and the display device according to the first data indicated by the indicating device, as follows ((a) to ( c )):

(a) the plurality of second data corresponding to the first data indicated by the indicating section are obtained from the memory section;

(b) the display frame corresponding to the first data indicated by the indicating section among the plurality of display frames shown in the display device, is expanded according to the obtained second data, and is displayed in the display device; and (c) the obtained second data is put in the expanded display frame together with the first data, and is displayed in the display device.

A program table display method according to a third view point of the present invention, comprises:

a memory step of storing, in a memory device, a plurality of first data respectively relating different programs, and a plurality of second data respectively corresponding to the first data and including the data more particular than the corresponding first data;

a display step of providing a plurality of display frames corresponding to the plurality of first data stored in the memory device at the memory step, and of displaying, in a display device, a program table having the plurality of corresponding first data put in each display frame;

an indicating step of indicating the desired first data among the plurality of first data in the program table shown in the display device at the display step;

a data obtaining step of obtaining the second data corresponding to the first data indicated at the indicating step, from the memory device; and a display control step of expanding the corresponding display frame among the plurality of display frames displayed in the display device at the display step, according to the second data obtained at the data obtaining step, and of putting the second data obtained at the data obtaining step together with the first data into the expanded display frame and of displaying them in the display device.

According to the present invention, the second data can be displayed in the program table, without damaging such a display form that the total image of the program table can be grasped. Furthermore, since the second data is displayed together with the first data in the expanded display frame, the second data can easily be confirmed. Moreover, in order to display the second data, it if sufficient to perform only the indication by the indicating section (or device), and therefore, the operation is easy.

DESCRIPTION OF THE PREFERRED EMBODIMENT

A preferred embodiment of the present invention will be described below by referring to the attached drawings.

Figure 5:
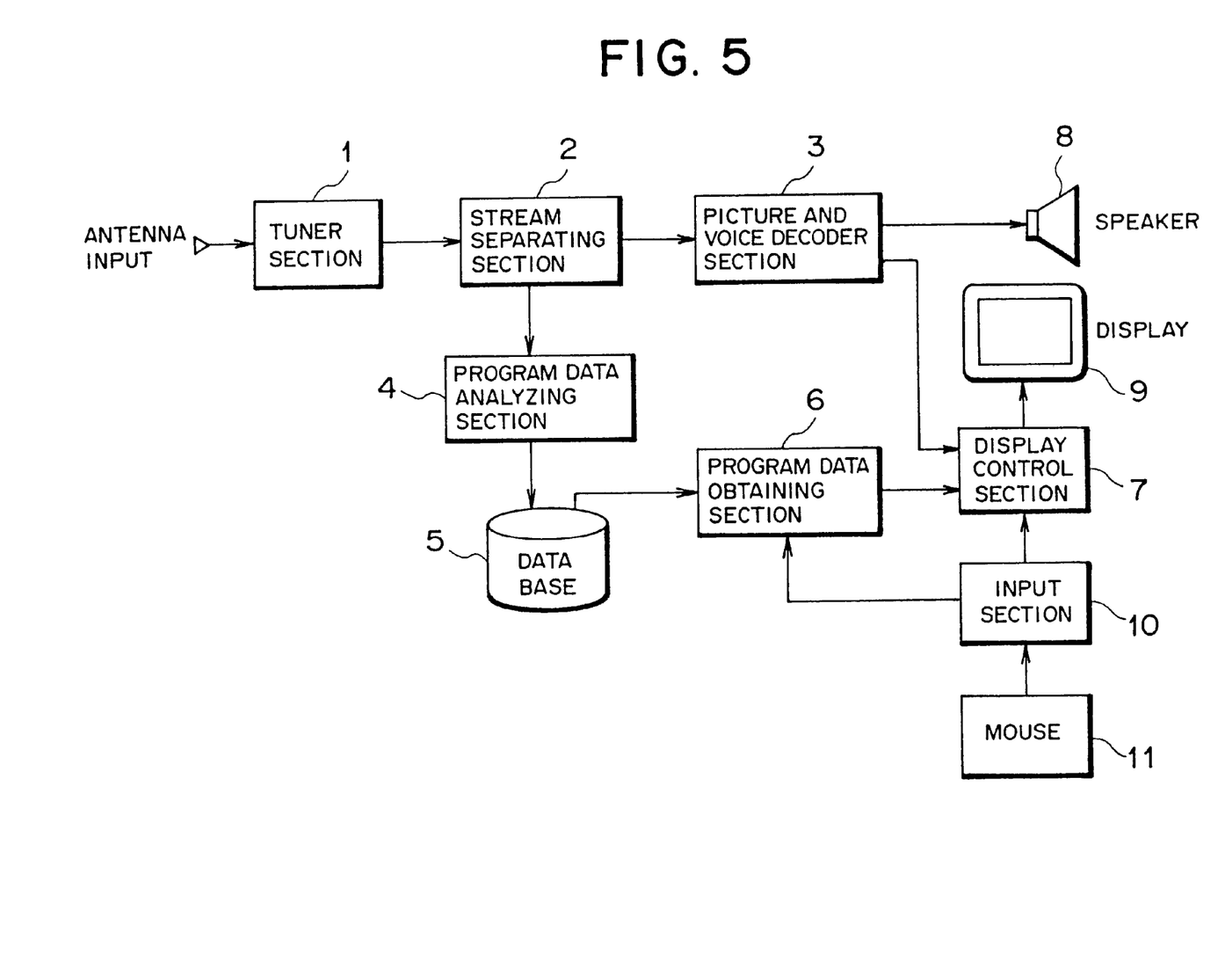
FIG. 5 is a block diagram showing the circuit arrangement of a television receiver with a character multiplex data display function to be applied to an example of the present invention.

FIG. 5 is a block diagram showing the circuit arrangement of a television receiver with the character multiplex data display function to be applied to the present example.

As shown in the figure, this television receiver with the character multiplex data display function has a tuner section 1, a stream separating section 2, a picture-voice decoder section 3, a program data analyzing section 4, a data base 5, a program data obtaining section 6, a display control section 7, a speaker 8, a display 9, an input section 10 and a mouse 11.

The tuner section 1 tunes the broadcasting radio waves received through the antenna, and demodulates the tuned picture-voice-data multiplexing stream (which are the signals made from the frequency-multiplexed picture signal, voice signal, and data signal included in the tuned broadcasting radio waves). The stream separating section 2 separates the picture signal and voice signal and the data signal, respectively, from the picture-voice-data multiplexing stream demodulated at the tuner section 1. The picture-voice decoder section 3 decodes the picture signal and the voice signal, respectively, separated at the stream separating section 2. The decoded voice signal and picture signal are supplied to the speaker 8 and the-display control section 7, respectively.

The program data analyzing section 4 analyzes the data of the program table included in the data signal separated at the stream separating section 2, and supplies the data to the data base 5. The data base 5 stores the data of the program table supplied from the program data analyzing section 4. The details of the data of the program table to be stored in the data base 5 will be described later.

The program data obtaining section 6 obtains the data of the program table stored in the data base 5, according to the control of the input section 10, and supplies the data to the display control section 6. The display control section 7 supplies, to the display 9, the picture corresponding to the picture signal supplied from the picture-voice decoder section 3, the picture corresponding to the data of the program table supplied from the program data obtaining section 6, or the picture made by putting these pictures one over the other.

The speaker 8 outputs the voice corresponding to the voice signal decoded at the picture-voice decoder section 3. The display 9 displays the picture made by putting the picture corresponding to the picture signal supplied from the display control section 7 and the picture corresponding to the data of the program table, one over the other. The input section 10 has a plurality of operational keys, and controls the program data obtaining section 6 and the display control section 7, according to the input of these plurality of operational keys or the indication from the mouse 11. The mouse 11 is a pointing device which indicates an arbitrary position on the picture displayed in the display 9.

Figure 6:
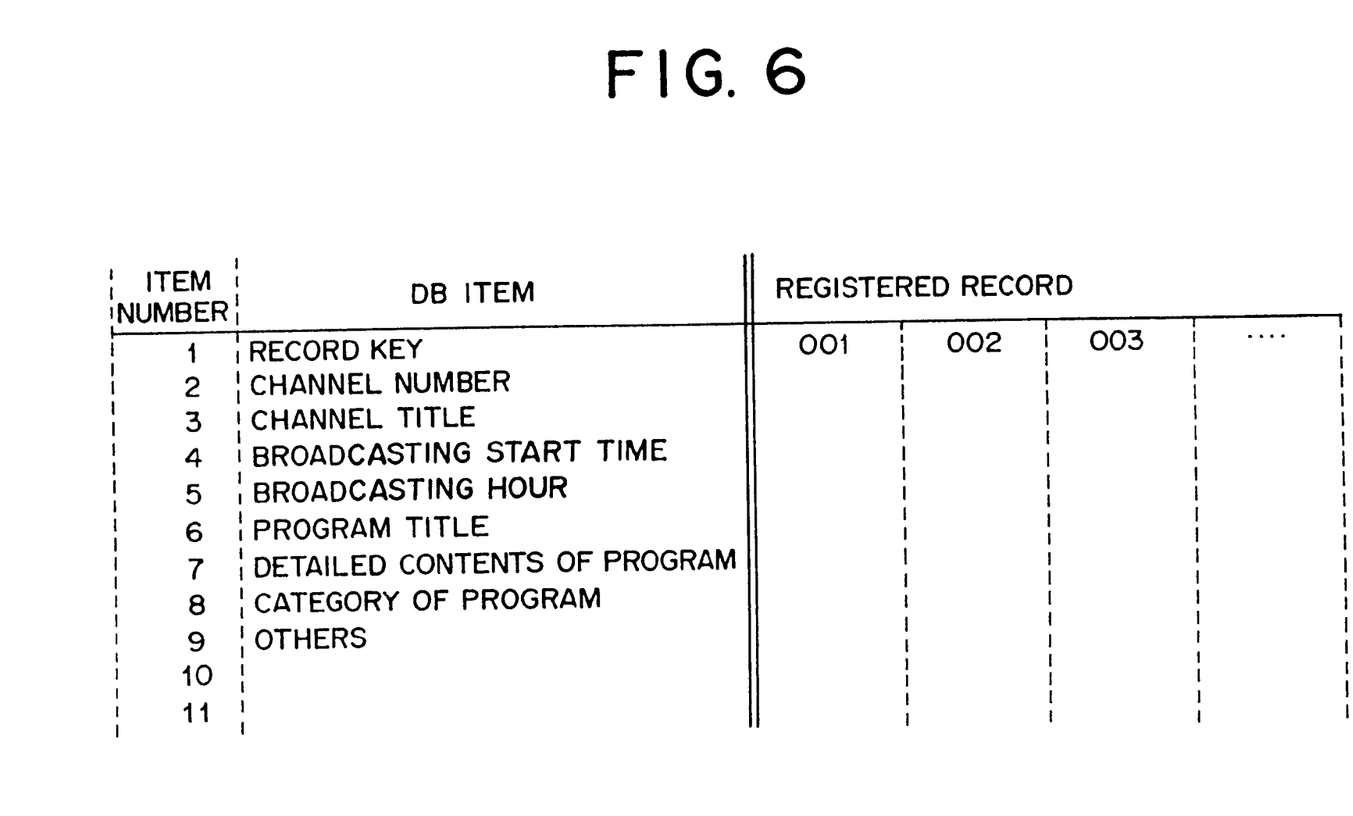
FIG. 6 is a figure showing the data arrangement of a program table to be stored in the data base in FIG. 5.

The data of the program table to be stored in the data base 5 will be described in detail. The data of the program table is registered in the data base 5 in such a way that 1 broadcasting program is 1 record. Each record comprises a record key allocated for each record, a channel number of the program in the record, a channel title, a broadcasting start time, a program title, detailed contents of the program, a category of the program and the other data.

The display method of the program table in a television receiver with the character multiplex data display function of the present example will be described below, by referring to the flow chart shown in FIG. 7 and examples of the display of the program table shown in FIG. 8 to FIG. 10.

Figure 7:
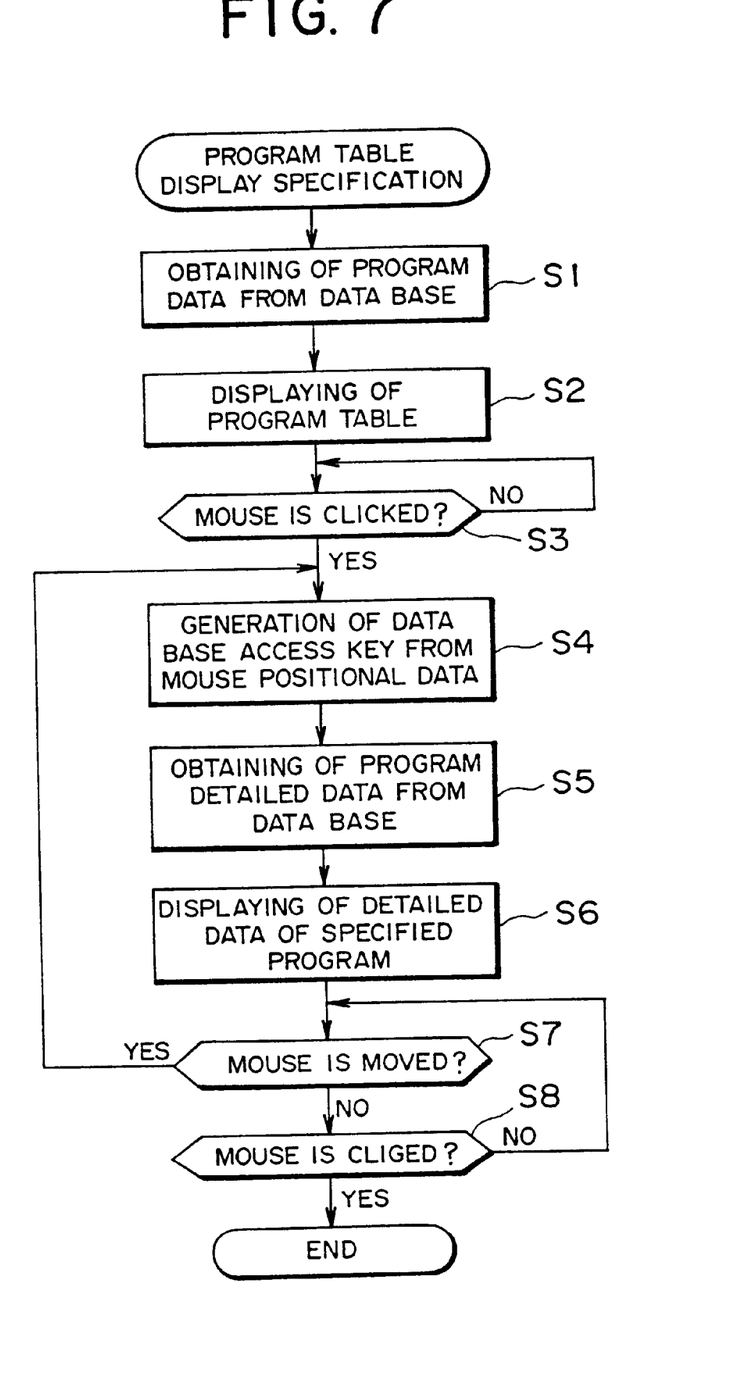
FIG. 7 is a flow chart showing the display processing of a program table in an example of the present invention.
Figure 8:
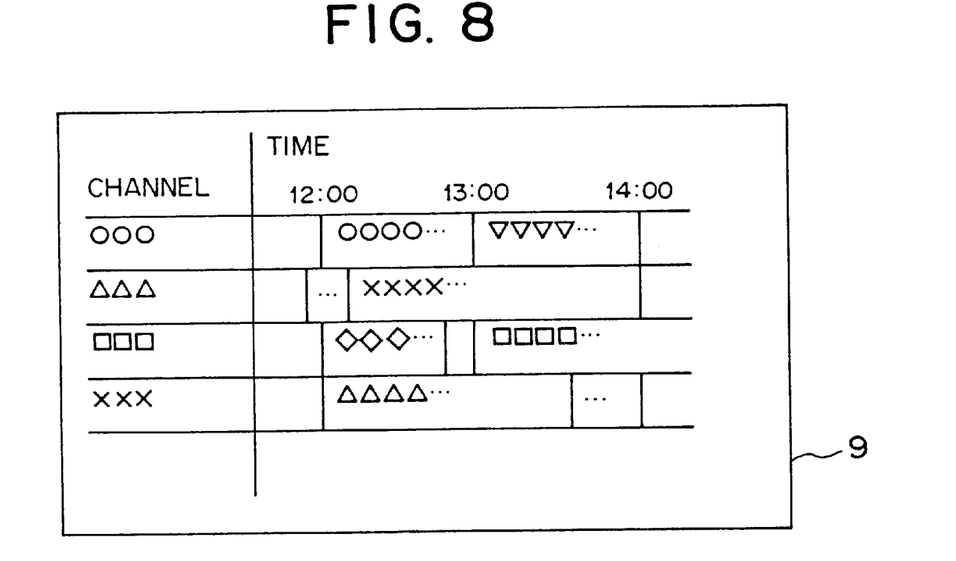
FIG. 8 is a figure showing an example of a program table displayed in the display.

When the user of a television receiver with the character multiplex data display function, operates a specified operational key in the input section 10 located in the box-like panel, or operates a specified operational key of a remote control unit (not shown in the figure), the processing of the flow chart shown in FIG. 7 starts.

When the processing of the flow chart shown in FIG. 7 starts, the program data obtaining section 6 selects and obtains the data of "channel title", "broadcasting start time", "broadcasting hour", and "program title" which are necessary for the display of the program-table, from the data base 5 and generates the data for the display of the program table on the basis of these obtained data (step S1).

The display control section 7 generates a picture of the program table on the basis of the data for the display of the program table generated by the program data obtaining section 6 at step S1, and displays it in the display 9 (step S2). The program table displayed in the display 9 at this time is, as shown in FIG. 8, respectively partitioned by equal widths in the vertical axis direction (hereafter, referred to as the channel axis direction) for every channel, and by equal widths in the horizontal axis direction (hereafter, referred to as the time axis direction) by the time unit, so that display frames may be formed. In the case where the total program title cannot be displayed in each display frame, the character string of that part is omitted in the program table.

Figure 9:
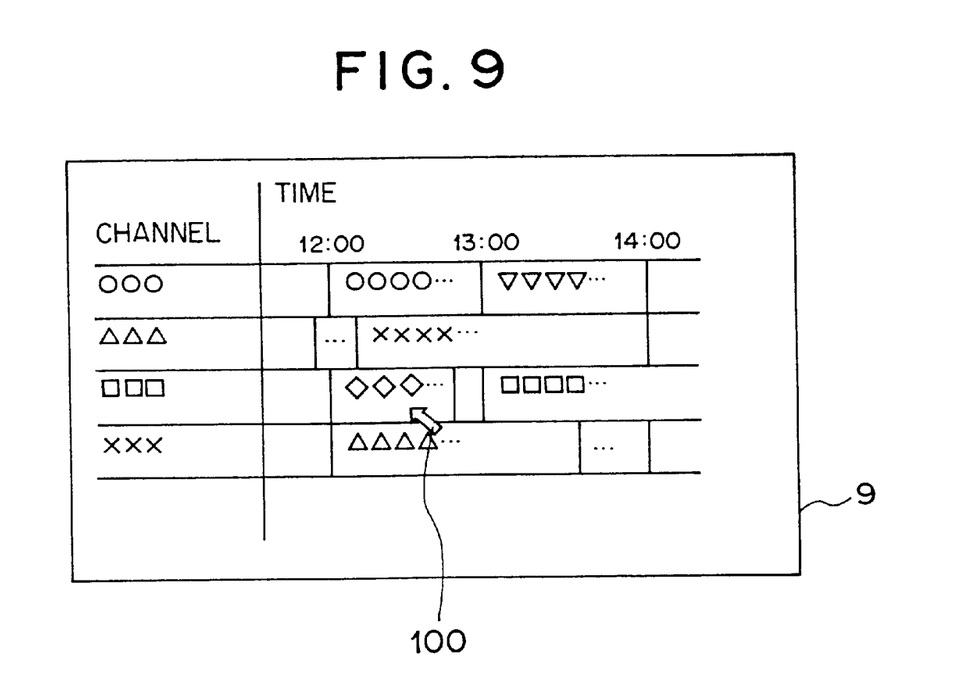
FIG. 9 is a figure showing an example of the state there a mouse cursor is fitted to a program table displayed in the display.

Next, by operating the mouse 11, the user fits the mouse cursor 100, as shown in FIG. 9, to the position of the name of the program whose detailed data the user wants to know, among the program names shown in the program table displayed in the display 9. In this state, the input section 10 waits for the clicking of the mouse 11 (step S3).

When the user clicks the mouse 11 and the input section 10 detects that, the input section 10 generates a data base access key for taking out the detailed data of the program corresponding to the position of the mouse cursor 100 from the data bags 5, and supplies it to the program data obtaining section 6 (step S4).

The program data obtaining section 6 takes out the detailed data shown by the data base access key supplied from the input section 10, that is, the data of "detailed contents of the program", "category of the program", or "others", from the data base 5, and supplies the data to the display control section 7 (step S5).

Figure 10:
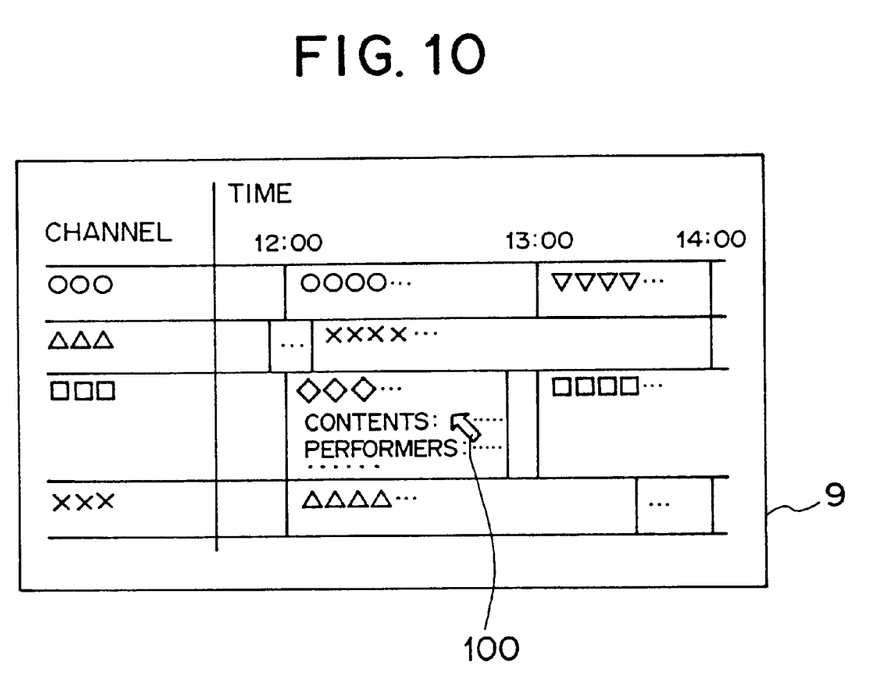
FIG. 10 is a figure showing an example in which the data relating to the specified program in the program table displayed in the display, is shown in detail.

The display control section 7 displays the detailed data supplied from the program data obtaining section 6, and further, in the case where a part of the program name is omitted to be displayed, the size in the channel axis direction and the size in the time axis direction of the program table are expanded up to the size capable of displaying the detailed data and the program name as shown in FIG. 10, in order to display all thereof. The display control section 7 generates a picture in which the detailed data supplied from the program data obtaining section 6 is embedded, in the space produced by expanding the program table, and displays.it in the display 9 (step S6).

Next, the input section 10 judges whether the mouse 11 has been moved so that the mouse cursor 100 may be positioned at the display position of another program name or not (step S7). When it is judged at step S7 that the mouse 11 has been moved, the step returns to step S4, and a processing similar to that of the above description is performed for the program name at which the mouse cursor 100 has newly been positioned, and the detailed data is displayed.

On the other hand, when it is judged at step S7 that the mouse 11 has not been moved, the input section 10 judges whether the mouse 11 has been clicked or not (step 8). However, the click at step S8 is different from that at step S3. For example, if the left button is clicked at step S3, the right button is clicked at step S8, or if the click at step S3 is a single click, the click at step S8 is a double click.

When it is judged at step S8 that the mouse 11 has not been clicked, the processing returns to the processing at step S7, and the judgments at step S7 and step S8 are repeated.

When it is judged at step S8 that the mouse 11 has been clicked, the processing of this flow chart is finished.

As mentioned above, in the television receiver with the character multiplex data display function of this embodiment, first, only the program name is displayed in the program table, and further, the program table is displayed in such a way that a part of a long program name is omitted. Therefore, a lot of display frames for displaying each program name can be displayed by 1 frame, so that the program table may be displayed in such a form that the total of the program table can easily be grasped.

Since a desired program is selected by using the mouse 11 from among the program names shown in the program table, the display frame corresponding to the selected program name is expanded in the channel axis direction and the time axis direction, and further, other display frames are moved corresponding thereto. Therefore, the display can be performed in a listing form, without damaging the display form as the total image of the program table, and the detailed data of the program is displayed in the expanded display frame, so that the confirmation of the detailed data can also easily be performed. Furthermore, since it is sufficient to perform only the selection of the desired program name by using the mouse 11, the operation is also easy.

In the above mentioned embodiment, the desired program was selected by fitting the mouse cursor 100 onto the program table displayed in the display 9, with the mouse 11. However, it is also possible to use another pointing device instead of the mouse 11. Furthermore, it is also possible to select a desired program by operating an operational key which also serves for the operational key of the channel selection, instead of selecting a desired program with the mouse 11.

In the above mentioned embodiment, the display column of the program to which the mouse cursor 100 was fitted, was expanded both in the channel axis direction and in the time axis direction. However, it is also possible to expand the display column of the program to which the mouse cursor 100 is fitted, only in either of the channel axis direction or the time axis direction. Furthermore, the detailed data relating to the program to which the mouse cursor 100 was fitted, was displayed by characters having the size equal to that of the characters of the program name, but it is also possible to make the size of the characters by which the detailed data is displayed, be smaller than the size of the characters of the program name.

In the above mentioned embodiment, the case where the program table included in the data of the character multiplex data superimposed over the television broadcasting waves sent on a radio is displayed in the display 9 of a television receiver with the character multiplex data display function, was described. However, the present invention can also be applied to the cable broadcasting. The program table to be displayed in the display 9 may be not only a table obtained by the reception from the broadcasting radio waves but also a table obtained by other methods. The present invention can also be applied to a program table other than a program table of the television broadcasting.

What is claimed is:

1. A program table display device, comprising:
   a memory section storing a plurality of first data respectively relating to different programs, and a plurality of second data respectively corresponding to said first data and including data more particular than said corresponding first data;
   a display section displaying a program table having said first data put in each display frame provided so as to correspond to each of said first data stored in said memory section;
   an indicating section indicating a desired first data among said plurality of first data in the program table shown in said display section;
   a data obtaining section obtaining said plurality of second data corresponding to the first data indicated by said indicating section, from said memory section; and
   a display control section which expands a corresponding display frame among the plurality of display frames displayed in said display section, according to the second data obtained by said data obtaining section, and which puts the second data obtained by said data obtaining section together with the first data into said expanded display frame and displays the data in said display section,
   wherein said display control section expands said corresponding display frame in a channel axis direction of said program table without obstructing the display of other ones of said plurality of display frames in said display section.

2. A program table display device, comprising:
   a memory section storing a plurality of first data respectively relating to different programs, and a plurality of second data respectively corresponding to said first data and including data more particular than said corresponding first data;
   a display section displaying a program table having said first data put in each display frame provided so as to correspond to each of said first data stored in said memory section;
   an indicating section indicating a desired first data among said plurality of first data in the program table shown in said display section;
   a data obtaining section obtaining said plurality of second data corresponding to the first data indicated by said indicating section, from said memory section; and
   a display control section which expands a corresponding display frame among the plurality of display frames displayed in said display section, according to the second data obtained by said data obtaining section, and which puts the second data obtained by said data obtaining section together with the first data into said expanded display frame and displays the data in said display section,
   wherein each display frame in said program table is displayed in said display section in parallel for every broadcasting channel of the program corresponding to the first data to be put in each display frame, and
   said display control section expands all display frames corresponding to the broadcasting channels of the program corresponding to the first data indicated by said indicating section, and displays the frame in said display section.

3. A program table display device, comprising:
   a memory section storing a plurality of first data respectively relating to different programs, and a plurality of second data respectively corresponding to said first data and including data more particular than said corresponding first data;
   a display section displaying a program table having said first data put in each display frame provided so as to correspond to each of said first data stored in said memory section;
   an indicating section indicating a desired first data among said plurality of first data in the program table shown in said display section;
   a data obtaining section obtaining said plurality of second data corresponding to the first data indicated by said indicating section, from said memory section; and
   a display control section which expands a corresponding display frame among the plurality of display frames displayed in said display section, according to the second data obtained by said data obtaining section, and which puts the second data obtained by said data obtaining section together with the first data into said expanded display frame and displays the data in said display section,
   wherein each display frame in said program table is displayed in said display section in such a way that positions are arranged for every broadcasting time zone of a program corresponding to the first data to be put in each display frame, and
   said display control section expands all display frames corresponding to the broadcasting time zone of a program corresponding to said first data indicated by said indicating section, and displays the frames in said display section.

4. A program table display device, comprising:
   a memory device storing a plurality of first data respectively relating to different programs, and a plurality of second data respectively corresponding to said first data and including data more particular than said corresponding first data;

a display device displaying a program table having said first data put in each display frame provided so as to correspond to each of said first data stored in said memory device;

an indicating device indicating a desired first data among said plurality of first data in the program table shown in said display device; and a control device which is connected to said memory device, said display device, and said indicating device, and which controls said memory device and said display device according to the first data indicated by said indicating device, and follows ((a) to (c)):

(a) said plurality of second data corresponding to the first data indicated by said indicating section are obtained from said memory section;

(b) a display frame corresponding to the first data indicated by said indicating section among a plurality of display frames displayed in said display device, is expanded according to said obtained second data, and is displayed in said display device; and (c) said obtained second data is put in said expanded display frame together with the first data, and is displayed in said display device.

wherein said control device expands said corresponding display frame in a channel axis direction of said program table without obstructing the display of other ones of said plurality of display frames in said display section.

5. A program table display method, comprising:

a memory step of storing, in a memory device, a plurality of first data respectively relating to different programs, and a plurality of second data respectively corresponding to said first data and including data more particular than said corresponding first data;

a display step of providing a plurality of display frames corresponding to said plurality of first data stored in said memory device at said memory step, and of displaying, in a display device, a program table having said plurality of corresponding first data put in each display frame;

an indicating step of indicating a desired first data among said plurality of first data in a program table shown in said display device at said display step;

a data obtaining step of obtaining said second data corresponding to said first data indicated at said indicating step, from said memory device; and a display control step of expanding a corresponding display frame among a plurality of display frames displayed in said display device at said display step, according to the second data obtained at said data obtaining step, and of putting the second data obtained at said data obtaining step together with the first data into said expanded display frame and of displaying the data in said display device;

wherein said display control step includes expanding said corresponding display frame in a channel axis direction of said program table without obstructing the display of other ones of said plurality of display frames in said display section.

6. A program table display device according to claim 1, wherein said display control section also expands said corresponding display frame in a time axis direction of said program table.

7. A program table display device according to claim 1, further comprising:

a user-operated input device for controlling said display control section, said display control section expanding said corresponding display frame based on a signal from said input device.

8. A program table display device according to claim 7, wherein said input device includes a first control means for controlling a positioning of a cursor displayed on said displayed program table and a second control means for expanding said corresponding frame.

9. A program table display device according to claim 8, wherein said second control means is a channel selection switch of said input device.

10. A program table display device according to claim 8, wherein said second control means includes a mouse button which expands said corresponding display frame when depressed a predetermined number of times.

11. A method for displaying program information on a display device, said display device including an input section for receiving display control signals, comprising:

displaying a program table on the display device, said program table including a plurality of display frames arranged in a two-dimensional matrix, each of said display frames containing information corresponding to a respective program;

inputting a display control signal into said input section, said display control signal corresponding to a request by a user to provide additional information about a program corresponding to a selected one of said display frames;

expanding said selected display frame in a vertical direction in said program table; and displaying said additional information in said selected expanded display frame.

12. A method according to claim 11, wherein said vertical direction corresponds to a channel axis direction of said program table, and a horizontal direction of said program table corresponds to a time axis in said program table.

13. A method according to claim 12, wherein in said expanding step, said selected display frame is expanded in said vertical direction in said program table without obstructing the display of other ones of said display frames.

14. A method according to claim 12, wherein said expanding step further includes:

expanding said selected display frame in a horizontal direction in said program table.

15. A method according to claim 12, wherein said display control signal is generated by a user-operated input device.

16. A method according to claim 15, wherein said user-operated input device includes a mouse control section for controlling positioning of a cursor on said displayed program table.

* * * * *